(12) United States Patent
Jang et al.

(10) Patent No.: US 7,624,483 B1
(45) Date of Patent: Dec. 1, 2009

(54) MULTI-ROLLER SNAP RING

(76) Inventors: James Jang, P.O. Box 3607, Agana, GU (US) 96932-3607; Ricardo Jang, 3639 Glenroy Ave., Anaheim, CA (US) 92804

( * ) Notice: Subject to any disclaimer, the term of this patent is extended or adjusted under 35 U.S.C. 154(b) by 414 days.

(21) Appl. No.: 11/616,802

(22) Filed: Dec. 27, 2006
(Under 37 CFR 1.47)

(51) Int. Cl.
*F16B 45/02* (2006.01)
(52) U.S. Cl. .............................. 24/599.1; 114/114; 43/8
(58) Field of Classification Search .................. None
See application file for complete search history.

(56) References Cited

U.S. PATENT DOCUMENTS

| | | | |
|---|---|---|---|
| 9,065 A * | 6/1852 | Barker | 114/114 |
| 104,601 A * | 6/1870 | Kirtland | 114/114 |
| 3,158,951 A | 12/1964 | Lewis et al. | |
| 4,894,944 A | 1/1990 | Jimenez | |
| 5,018,295 A | 5/1991 | Taylor, IV et al. | |
| 5,119,735 A | 6/1992 | Jang et al. | |
| D340,106 S | 10/1993 | Hystad | |
| D340,760 S | 10/1993 | Hystad | |
| 5,287,645 A * | 2/1994 | Gois | 43/14 |
| D348,302 S | 6/1994 | Gois | |
| 5,423,146 A | 6/1995 | Hystad | |
| 5,505,013 A | 4/1996 | Gois | |
| 5,655,327 A | 8/1997 | Wardell, Jr. | |
| 5,864,929 A | 2/1999 | Sakong | |
| 6,588,076 B1 * | 7/2003 | Choate | 24/600.2 |

* cited by examiner

*Primary Examiner*—Jack W. Lavinder
(74) *Attorney, Agent, or Firm*—Greenberg Traurig (57) ABSTRACT

Described is a multi-roller snap ring with one or more rollers extending across a space defined by a frame and one or more rollers integrated within the frame of the snap ring. The multiple rollers reduce and mitigate the frictional wear and tear caused by a purse line being drawn through the snap ring during purse seine deployment and retrieval operations. In addition, a locking mechanism with a spring-loaded, sliding and rotating lock forming a portion of the frame and a stopper tab are disclosed.

22 Claims, 8 Drawing Sheets

MULTI-ROLLER SNAP RING

FIELD OF THE INVENTION

The embodiments of the present invention relate to fishing equipment, more specifically, a multi-roller snap ring for connecting a purse line to a purse seine.

BACKGROUND

Figure 1:
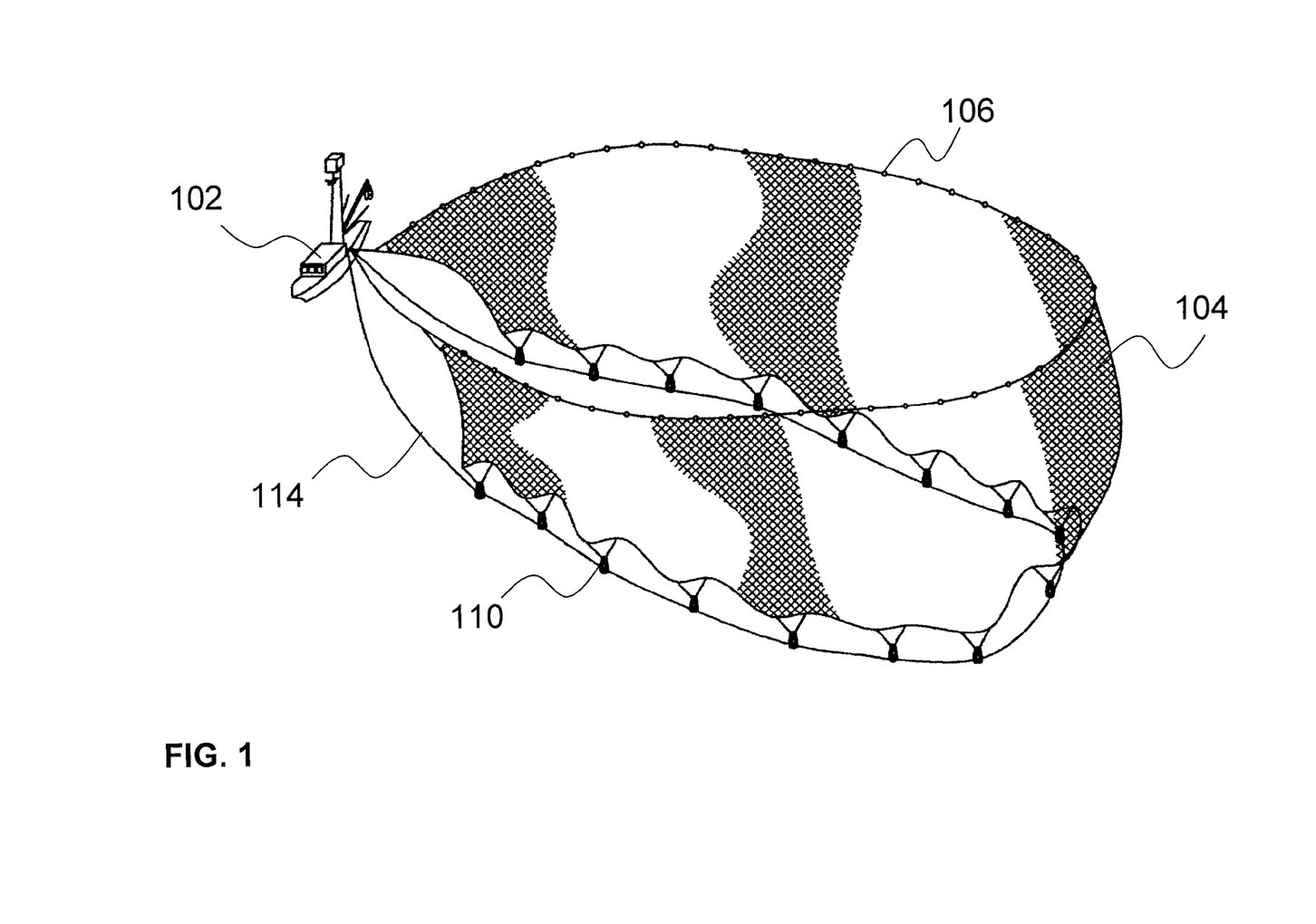
FIG. 1 illustrates a perspective view of a fishing vessel engaging in commercial fishing operation.
Figure 2:
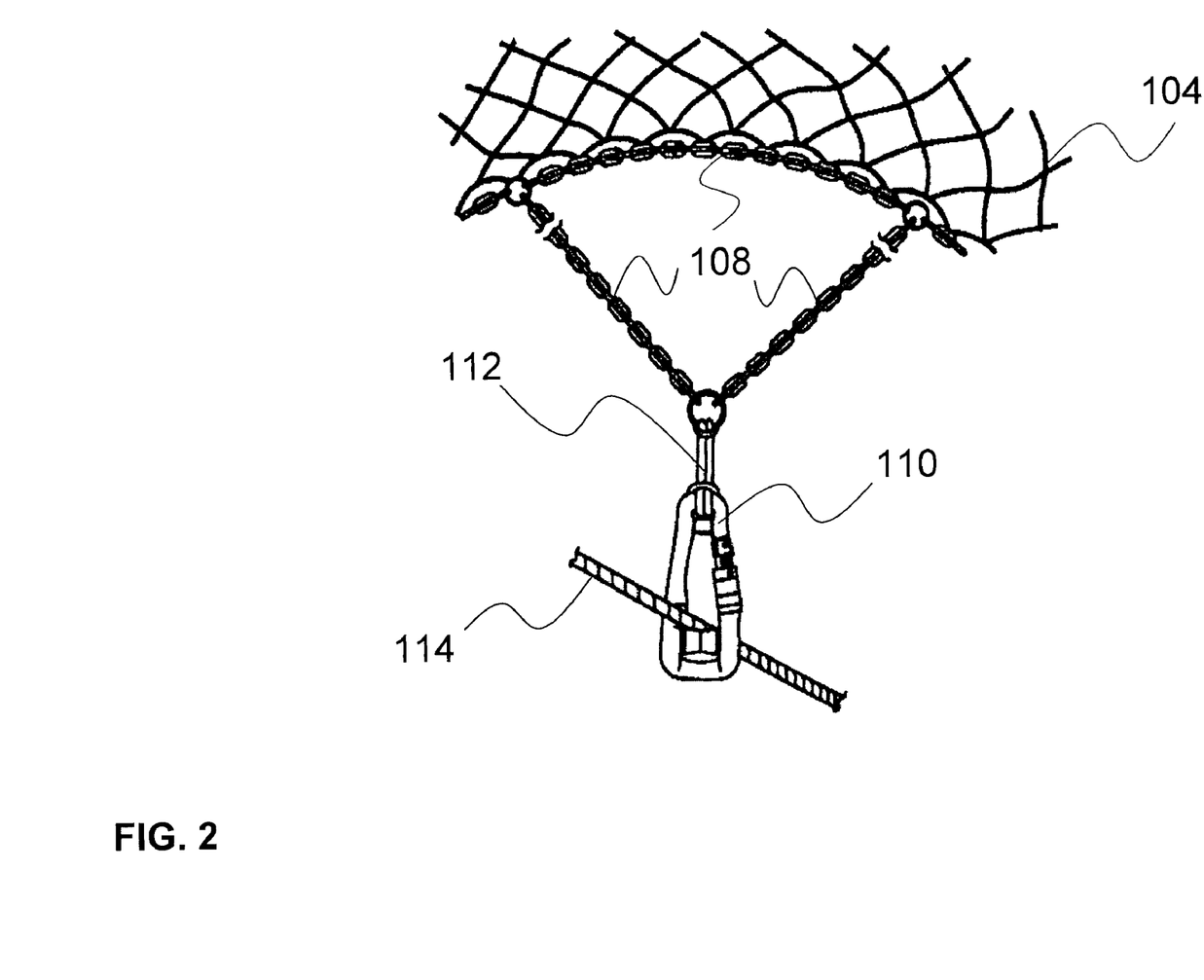
FIG. 2 illustrates a perspective view of a prior art purse ring connected to a purse seine and a purse line.

Initial reference is made to FIG. 1 illustrating a perspective view of a fishing vessel 102 engaging in commercial fishing operation using a large fishing net such as a purse seine 104. When the purse seine 104 is deployed, generally defining a loop encompassing a large section of water, a top edge of the purse seine 104 remains on the surface of the water by means of buoys or floatation devices 106, while a bottom edge of the purse seine 104 is lined with chains 108 causing it to submerge as best illustrated in FIG. 2. As a result of the chains 108 along the bottom edge of the net and buoys 106 along the top edge, the purse seine 104 hangs vertically in the water thereby trapping fish within the defined loop. Besides chains 108, other items having substantial weight may be used.

One known method of retrieving the purse seine 104 is facilitated by attaching purse rings 110 along the bottom edge of the purse seine 104 and running a purse line 114 through the purse rings 110. As illustrated in FIG. 2, one end of the purse ring 110 is coupled to the chains 108 via a rope or strap 112, while the purse line 114 runs through another end of the purse ring 110. Accordingly, when the purse line 114 is pulled, it draws each of the purse rings 110 attached on the purse seine 104 together thereby effecting the retrieval process.

As can be imagined, the forces generated between the purse line 114 and the purse ring 110 during the retrieval operation can be significant due to the weight and size of the purse seine 104, as well as the weight of the catch. Consequently, the tremendous frictional forces generated can cause significant wear and tear on both the purse ring 110 and the purse line 114. Eventually, the frictional forces can translate into erosion and/or mechanical failure of the purse ring 110 and/or fraying of the purse line 114 thereby leading to costly repairs and/or replacements and possible downtime and lost revenue.

Thus, there exists a need for a snap ring design that significantly mitigates the frictional forces generated between the purse ring 110 and the purse line 114 thereby extending their lifetimes and reducing repair and/or replacement costs.

SUMMARY

Accordingly, one embodiment of the present invention is a multi-roller snap ring, comprising a frame defining a space; and three or more rollers disposed within the space, wherein at least one roller extends across the space and at least one roller is integrated within the frame. In another embodiment, the purse ring further comprises a locking mechanism forming a portion of the frame wherein the locking mechanism is operable to permit and prevent access to the space. Ideally, the locking mechanism comprises a concealed spring and a guiding pin.

Other variations, embodiments and features of the present invention will become evident from the following detailed description, drawings and claims.

DETAILED DESCRIPTION

It will be appreciated by those of ordinary skill in the art that the invention can be embodied in other specific forms without departing from the spirit or essential character thereof. The presently disclosed embodiments are therefore considered in all respects to be illustrative and not restrictive.

Figure 3:
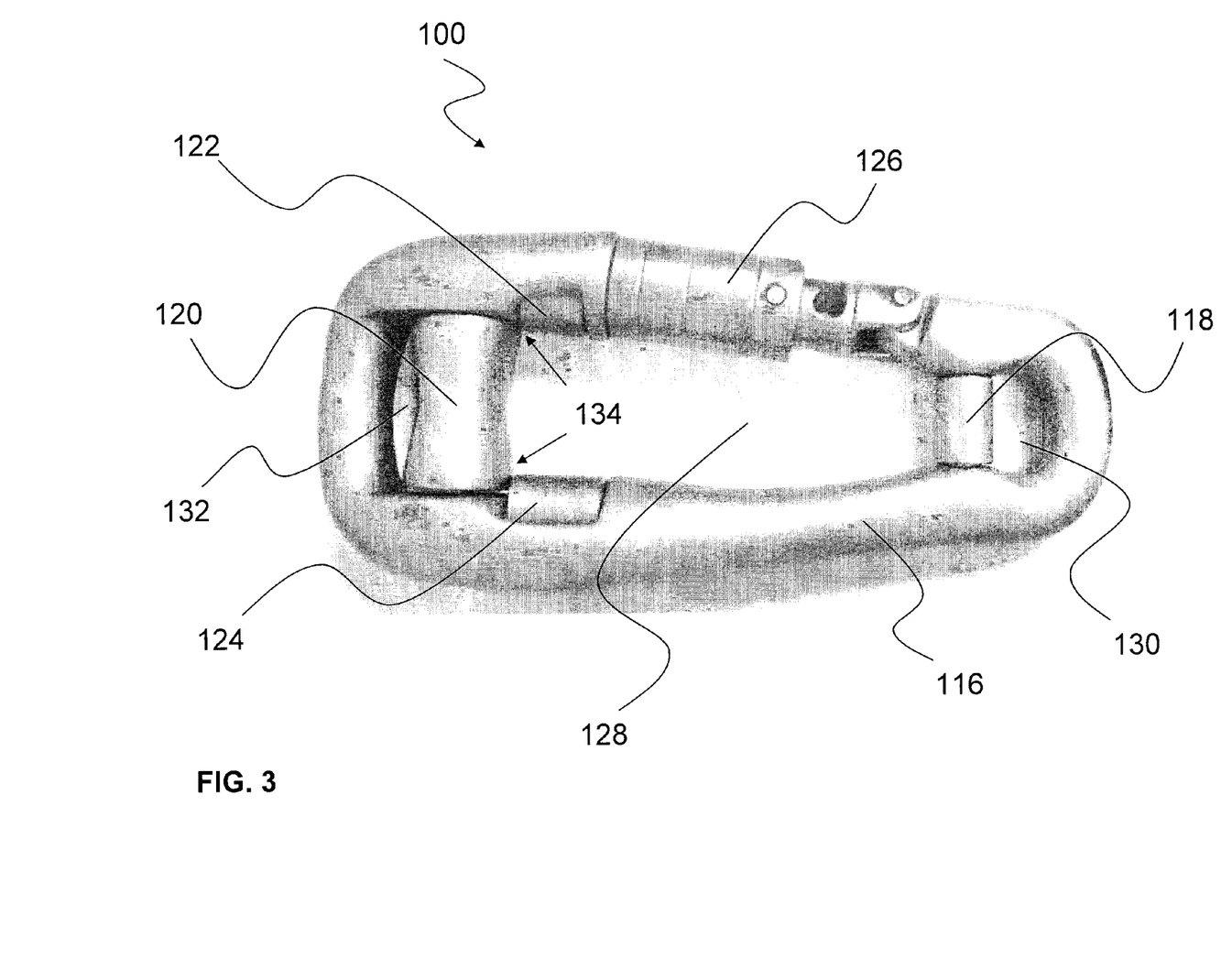
FIG. 3 illustrates a perspective view of a multi-roller snap ring according to an embodiment of the present invention.

Reference is now made to FIG. 3 illustrating a perspective view of a multi-roller snap ring 100 according to an embodiment of the present invention. The multi-roller snap ring 100 includes a frame 116 having two rollers 118, 120 extending between opposite sides of the frame 116 and two rollers 122, 124 integrated within the frame 116. Ideally, the frame 116 is constructed of stainless steel. However, the frame 116 can also be constructed of carbonized steel, galvanized metal or other corrosion-resistant alloys and combinations thereof wherein the material has sufficient mechanical strength. Although the frame 116 has a substantially rounded rectangular shape, it will be appreciated by those skilled in the art that the frame 116 can take on any polygonal shape sufficient for connecting a purse line 114 to a purse seine 104. The multi-roller snap ring 100 also includes a locking mechanism 126 integrated with the frame 116. The purpose and operation of the locking mechanism 126 is set forth in detail below.

The frame 116 of the multi-roller snap ring 100 defines a first space 128 through which a purse line 114 can be drawn, while a rope or strap 112 for coupling the multi-roller snap ring 100 to a purse seine 104 can be drawn through a second space 130. Alternatively, the rope or strap 112 can be drawn through a third space 132. As described above, when the purse line 114 is pulled during the retrieval of the purse seine 104, frictional forces are generated between the purse line 114 and the frame 116, more specifically, frictional forces are generated between the purse line 114 and elements defining the first space 128. In this instance, the purse line 114 readily makes physical contact with the rollers 118, 120, 122, 124 as well as the body of the frame 116, including locking mechanism 126. One of the advantages of the presently disclosed multi-roller snap ring 100 is realized as the purse line 114 moves about within the first space 128, especially near the corners of the first space 128 as indicated by arrows 134. Because of the multiple rollers 118, 120, 122, 124, frictional forces that would normally cause the frame 116 to deteriorate over time can now be substantially reduced or mitigated.

Although the previous embodiment utilizes four rollers 118, 120, 122, 124 and defines three spaces 126, 128, 130, it will be appreciated by one skilled in the art that three, five, six or more rollers can be used and one, two, four or more spaces can be defined within the multi-roller snap ring 100 as necessary. In addition, the exterior of the locking mechanism 126 can be formed to include a roller assembly or an anti-frictional element (not shown).

Figure 4:
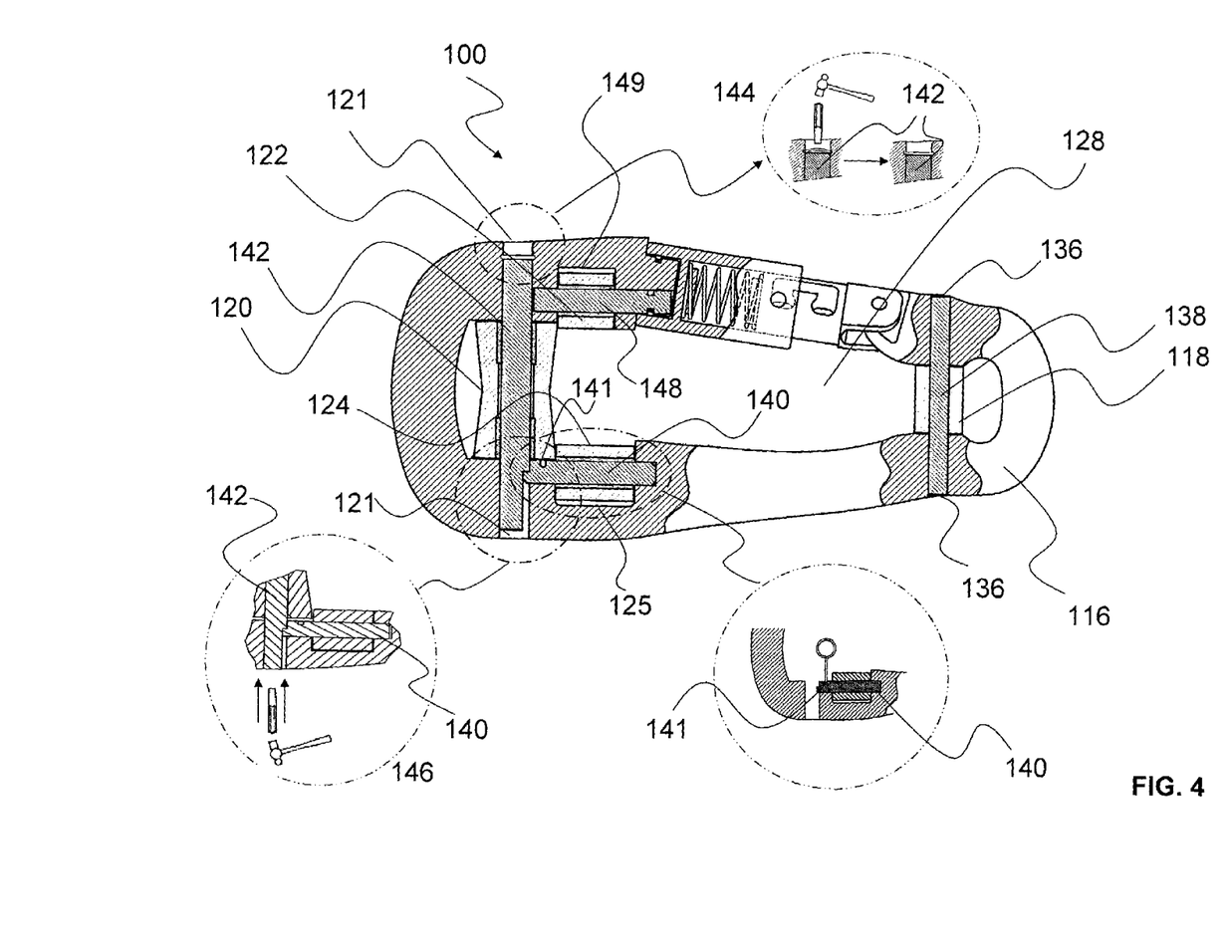
FIG. 4 illustrates an exploded view of a multi-roller snap ring.

Reference is now made to FIG. 4 illustrating an exploded perspective view of the multi-roller snap ring 100. The first roller 118 can be extended across the space 128 from opposite sides of the frame 116 by initially providing apertures or openings 136 through the body of the frame 116 such that the first roller 118 is supported by a first axle or shaft 138. The openings 136 can be formed by drilling or milling through the frame 116 or by other known methods, and subsequently wedged or sealed after the first shaft 138 has been inserted through a first opening 136, coupled to, or inserted through, the first roller 118 and inserted into the second opening 136. Ideally, the wedge or seal of the openings 136 is removable to allow for repairs or replacements. The first roller 118 and the first shaft 138 can be constructed of the same or similar material used to construct the frame 116. Therefore, ideally, the first roller 118 and the first shaft 138 are constructed of stainless steel.

The second roller 124 can be integrated within the frame 116 by initially creating a notch 125 within a portion of the frame 116. In place, the second roller 124 is supported by a second shaft 140 extending across the notch 125 and held in place at opposite ends thereof. Like the openings 136, the notch 125 can be drilled or milled or formed by other known methods. Likewise, the second roller 124 and the second shaft 140 can be constructed of the same or similar material used to construct the frame 116. The second shaft 140 further includes a small aperture 141 to facilitate its removal using a tool as illustrated in the figure.

Figure 5:
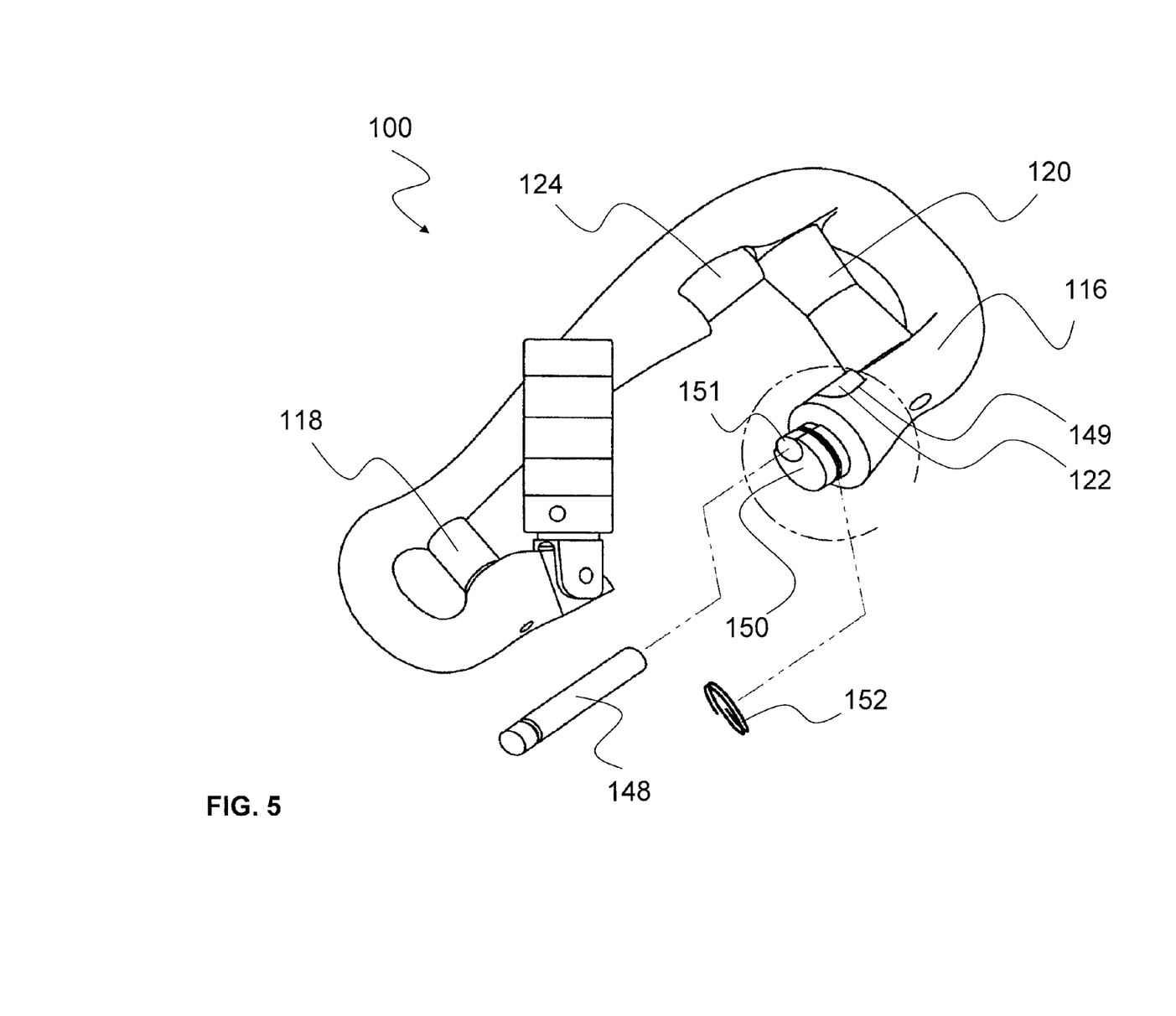
FIG. 5 illustrates a perspective view of construction of a roller on a multi-roller snap ring.

Reference is now made to FIGS. 4 and 5 illustrating a perspective view of integrating the third roller 122 for the multi-roller snap ring 110. As shown, a notch 149 is initially created within a portion of the frame 116 by known methods. In order to insert the third shaft 148 for supporting the third roller 122, an opening 151 is formed within a protrusion tab 150. The protrusion tab 150 facilitates releasing and securing the locking mechanism 126 as set forth in more detail below. The third shaft 148 is then inserted through the opening 151 and the third roller 122 thereby providing support for the third roller 122. The third shaft 148 then extends through the entire length of the aperture 149. To secure or fasten the third shaft 148 to the protrusion tab 150, a coil or ring 152 can be utilized. Alternatively, the third shaft 148 can be securely coupled to the protrusion tab 150 by other known fastening methods. Like the other rollers and shafts, the third roller 122 and the third shaft 148 can also be constructed of the same or similar material used to construct the frame 116.

Referring again to FIG. 4, the fourth roller 120 can be extended across the space 128 from opposite sides of the frame 116 in a manner similar to that used to extend first roller 118 by initially providing openings 121 through the frame 116 and supporting the fourth roller 120 with a fourth shaft 142. As illustrated, at one end 146 of the opening 121, the fourth shaft 142 and the second shaft 140 can be shaped to complement or interact with each other as needed. After the fourth roller 120 has been coupled to the fourth shaft 142, another end 144 of the opening 121 can be capped or wedged with a sealing ring and a hammer. Ideally, the cap is removable allowing for repairs and/or replacements. Like above, the fourth roller 120 and the fourth shaft 142 can be constructed of the same or similar material used to construct the frame 116.

As illustrated in FIGS. 4 and 5, the rollers 118, 122, 124 can be cylindrical or contain a central indentation forming a bowtie or hour glass shaped cylinder as best illustrated by the fourth roller 120. One skilled in the art will appreciate that the four rollers 118, 120, 122, 124 can be any type of roller or roller assembly as well as other forms of anti-frictional means for providing the frictional relief generated between the purse line 114 and the multi-roller snap ring 110.

Figure 6:
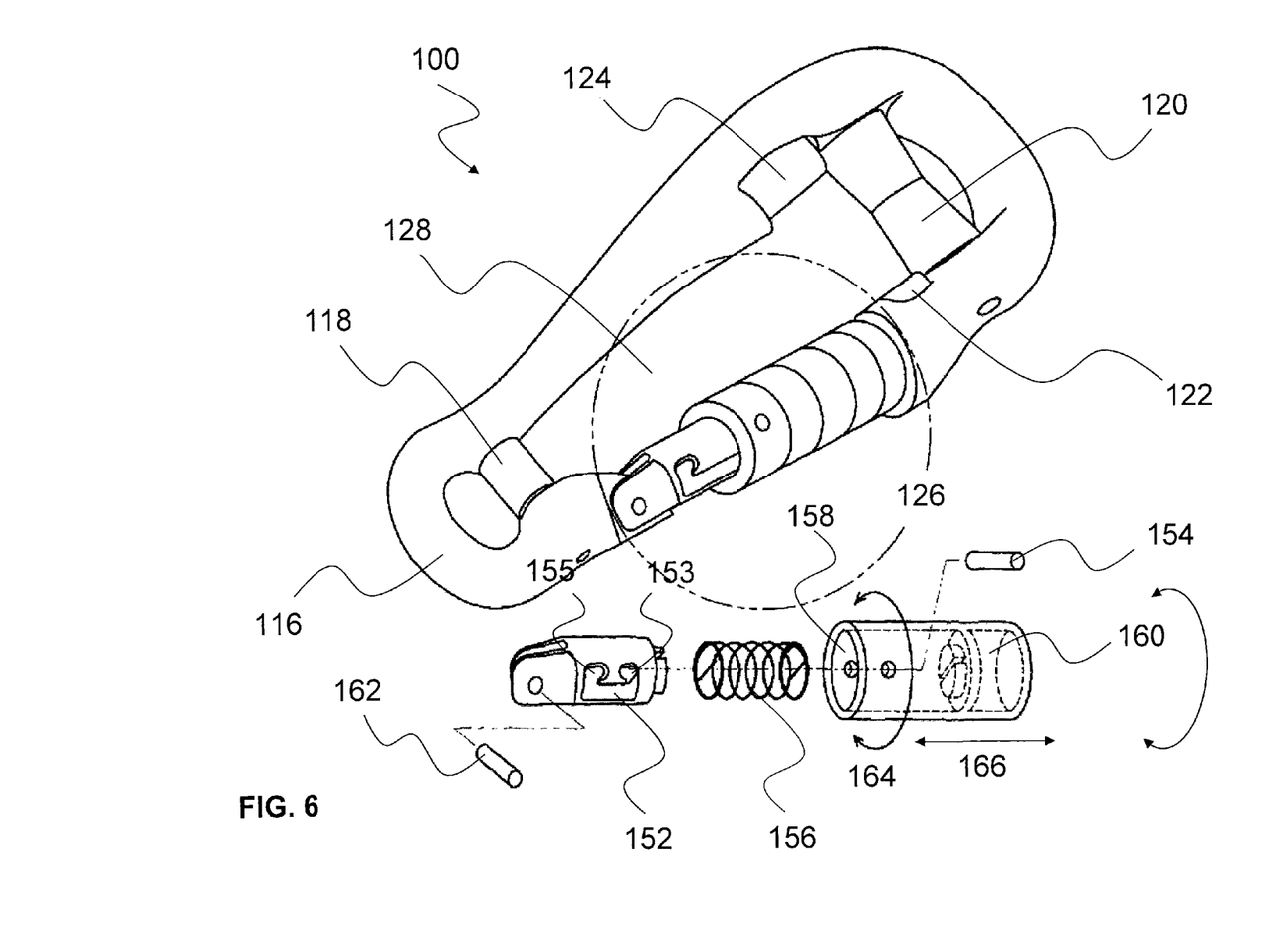
FIG. 6 illustrates an exploded view of a locking mechanism on a multi-roller snap ring.

Reference is now made to FIG. 6 illustrating a perspective view of the locking mechanism 126 of the multi-roller snap ring 110. The locking mechanism 126 includes a cylindrical element 158 for providing access to the first space 128. The cylindrical element 158 is adapted to receive a spring 156 and a guiding channel 152, along with a guide pin 154. The guide pin 154 is positioned within the guiding channel 152 and extends through the cylindrical element 158. The guide pin 154 is adapted for sliding movement throughout the guiding channel 152 via rotational 164 and axial 166 movements of the cylindrical element 158. The cylindrical element 158 further includes a cavity 160 for receiving the protrusion tab 150 (best illustrated in FIG. 5 and FIG. 7A). To limit access to the first space 128, the protrusion tab 150 is received and retained by the cavity 160. To provide access to the first space 128, the protrusion tab 150 is released from the cavity 160. The protrusion tab 150 functions as a gate keeper/tab. The guiding channel 152 can be pivotably secured to the frame 116 via a pivot pin 162 that extends through a slot in the frame 116 to form a pivoting arm. The guiding channel 152 can also be pivotably secured to the frame 116 by other known methods.

Figure 7A:
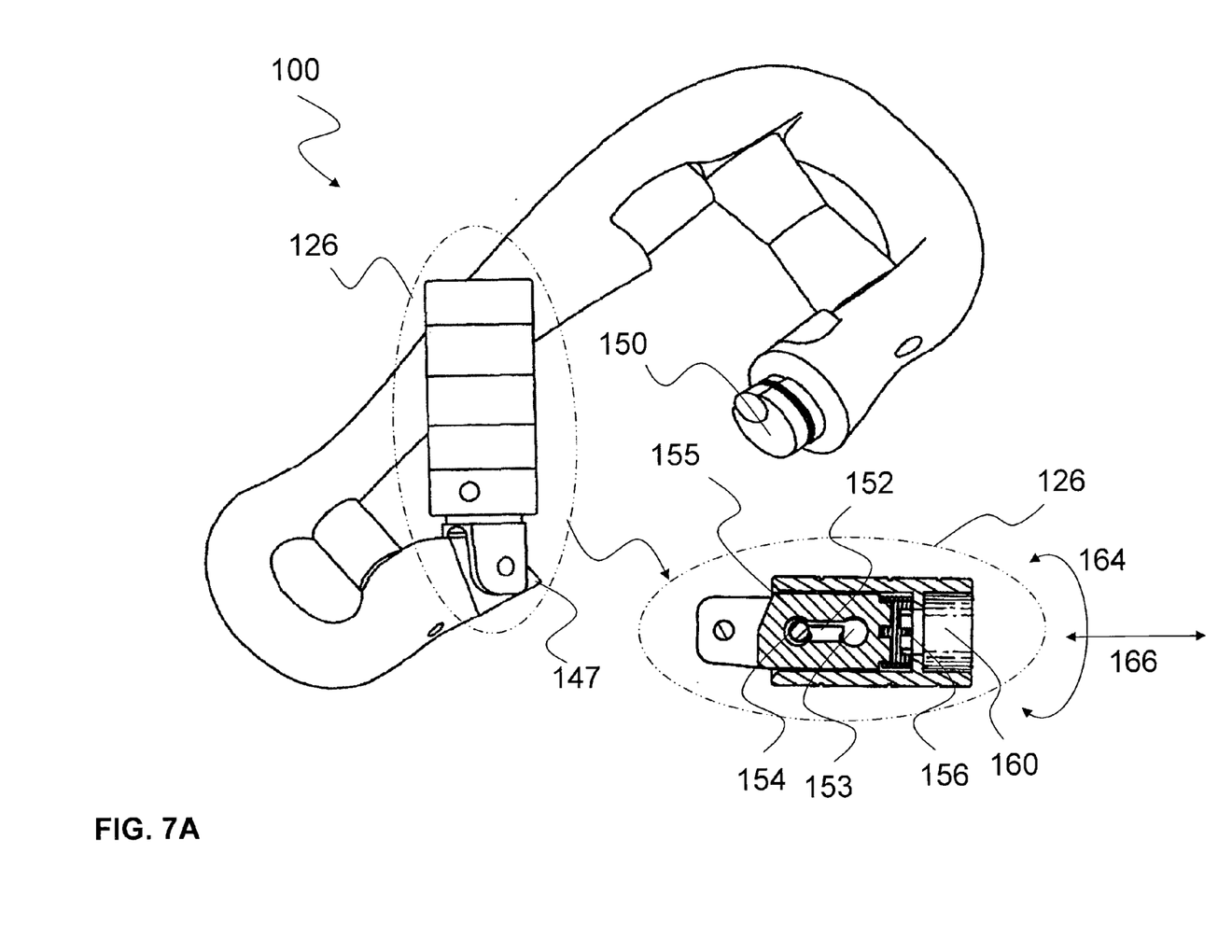
FIGS. 7A-7B illustrate perspective views detailing a method of releasing and securing the locking mechanism, respectively.

In operation, to release the locking mechanism 126 and provide access to the first space 128, the guide pin 154 is moved from a first position 153 to a second position 155, which can be accomplished by first rotating 164 the cylindrical element 158 thereby moving the guide pin 154 out of the first position 153 and into the guiding channel 152. Next, axial forces 166 are applied to the cylindrical element 158 thus compressing the spring 156 and forcing the guide pin 154 along the length of the guiding channel 152. A subsequent rotational movement 164 of the cylindrical element 158 moves the guide pin 154 currently situated in the guiding channel 152 into the second position 155 thereby releasing the locking mechanism 126 as best illustrated in FIG. 7A. Once the guide pin 154 has been moved into the second position 155, the cavity 160 no longer retains the protrusion tab 150. Accordingly, the cylindrical element 158 can be moved freely thus providing access to the first space 128. One way of dictating the direction and magnitude of tiling or rotating the cylindrical element 158 is to integrate a stopper tab 147 on the body of the frame 116. In doing so, the stopper tab 147 determines and limits where access to the first space 128 will be made available and by what amount.

Figure 7B:
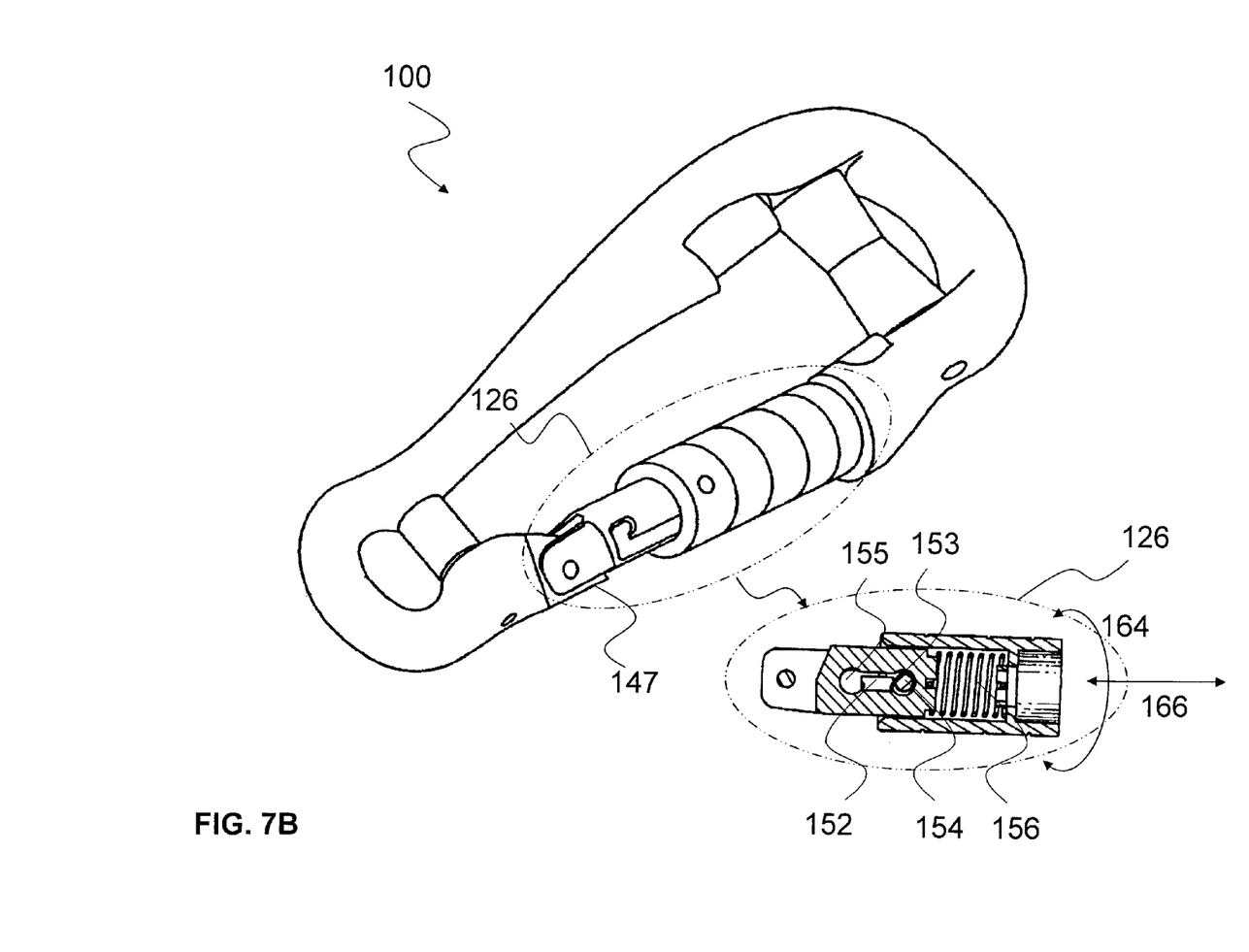

Performing the procedure as previously described in reverse secures the locking mechanism 126 to the frame 116 and limits access to the first space 128. Specifically, moving the guide pin 154 from the second position 155 to the first position 153 is accomplished by rotating 164 the cylindrical element 158 thus moving the guide pin 154 out of the second position 155 and into the guiding channel 152. Next, axial forces 166 can be applied on the cylindrical element 158 thus releasing the compression exerted on the spring 156 and forcing the guide pin 154 along the length of the guiding channel 152. A subsequent rotational movement 164 of the cylindrical element 158 moves the guide pin 154 currently situated in the guiding channel 152 into the first position 153 thereby securing the locking mechanism 126 as best illustrated in FIG. 7B. Once the guide pin 154 has been moved into the first position 153, the cavity 160 is now in position to receive and retain the protrusion tab 150 which is subsequently hidden within the cavity 160. Accordingly, the combination of rotational 164 and axial 166 movements of the cylindrical element 158 prevent accidental or undesired access to the first space 128. Furthermore, as the locking mechanism 126 is secured to limit access to the first space 128, the stopper tab 147 prevents the cylindrical element 158 from over-rotating or over-extending. An additional benefit of the presently disclosed locking mechanism 126 is further realized since the spring 156, the guiding channel 152 and major portions of the guide pin 154 reside within the cylindrical element 158 thereby minimizing their exposure to corrosive seawater and other environmental hazards. Ideally, the spring 156, the guiding channel 152, the guide pin 154, and the cylindrical element 158 are constructed of stainless steel. However, other known corrosion resistant alloys and materials can also be utilized.

Although the invention has been described in detail with reference to several embodiments, additional variations and modifications exist within the scope and spirit of the invention as described and defined in the following claims.

We claim:

1. A multi-roller snap ring, comprising:
   a frame defining a space; and
   three or more rollers disposed within the space, wherein at least one roller extends across the space, and at least two rollers are integrated within the frame such that a portion of each of the rollers integrated within the frame is concealed by the frame; and
   wherein the two integrated rollers and roller extending across the space are held in place by three shafts forming a U-shape.

2. The multi-roller snap ring according to claim 1, further comprising a locking mechanism wherein the locking mechanism is operable to permit or prevent access to the space.

3. The multi-roller snap ring according to claim 2, wherein the locking mechanism comprises a concealed spring and a guiding pin.

4. The multi-roller snap ring according to claim 1, wherein at least two rollers extend across the space.

5. The multi-roller snap ring according to claim 1, wherein the frame and/or rollers are constructed of stainless steel, carbonized steel, galvanized metal or other corrosion-resistant alloy or combinations thereof having sufficient mechanical strength.

6. The multi-roller snap ring according to claim 1, further comprising a stopper tab operable to control an amount of access to the defined space.

7. A multi-roller snap ring, comprising:
   a frame defining a space;
   three or more rollers disposed adjacently within the space, wherein one roller extends across the space, and two rollers are integrated within the frame such that a portion of each of the rollers integrated within the frame is concealed by the frame wherein the two integrated rollers and roller extending across the space are held in place by three shafts forming a U-shape; and
   a locking mechanism forming a portion of the frame, the locking mechanism operable to permit or prevent access to the space.

8. The multi-roller snap ring according to claim 7, wherein the locking mechanism comprises a concealed spring and a guiding pin.

9. The multi-roller snap ring according to claim 7, wherein at least two rollers extend across the space.

10. The multi-roller snap ring according to claim 7, wherein the frame and/or rollers are constructed of stainless steel, carbonized steel, galvanized metal or other corrosion-resistant alloy or combinations thereof having sufficient mechanical strength.

11. The multi-roller snap ring according to claim 7, further comprising a stopper tab operable to dictate a range of access to the defined space.

12. A multi-roller snap ring, comprising:
    a frame defining a space; and
    four rollers disposed within the space, wherein two rollers extend across the space, and two rollers are integrated within the frame such that a portion of each of the two rollers integrated within the frame is concealed by the frame, one of said two rollers extending across the frame being adjacent to the two rollers integrated within the frame, and wherein the two integrated rollers and adjacent roller extending across the space are held in place by three shafts forming a U-shape.

13. The multi-roller snap ring of claim 12, wherein the two integrated rollers are positioned on opposite sides of the frame and adjacent to one of the roller extending across the space.

14. The multi-roller snap ring according to claim 12, further comprising a locking mechanism wherein the locking mechanism is operable to permit or prevent access to the space.

15. The multi-roller snap ring according to claim 14, wherein the locking mechanism comprises a concealed spring and a guiding pin.

16. The multi-roller snap ring according to claim 12, wherein the frame and/or rollers are constructed of stainless steel, carbonized steel, galvanized metal or other corrosion-resistant alloy or combinations thereof having sufficient mechanical strength.

17. The multi-roller snap ring of claim 12, further comprising a stopper tab operable to control an amount of access to the defined space.

18. A multi-roller snap ring comprising:
    a frame defining a space;
    a first roller extending across the space;
    at least a second and third roller disposed within the space adjacent to the first roller, wherein said at least second and third rollers being integrated within the frame such that a portion of each of the second and third rollers is concealed by the frame and wherein the second and third rollers and first roller are held in place by a three shafts forming a U-shape;
    a locking mechanism wherein the locking mechanism is operable to permit or prevent access to the space; and
    a stopper tab operable to control a range of access to the space.

19. The multi-roller snap ring according to claim 18, wherein the locking mechanism comprises a concealed spring and a guiding pin.

20. The multi-roller snap ring according to claim 18, wherein the locking mechanism requires both rotational and lateral movements to lock and unlock.

21. The multi-roller snap ring of claim 18, wherein removal of a shaft holding in place the roller extending across the space allows the second and third rollers to be removed.

22. The multi-roller snap ring of claim 18, wherein one of said second or third rollers includes a cavity for receipt of a removal tool.

* * * * *